United States Patent
Hua et al.

(10) Patent No.: US 12,513,033 B2
(45) Date of Patent: Dec. 30, 2025

(54) SIGNAL MODULATION METHOD AND DEVICE, AND STORAGE MEDIUM

(71) Applicant: ZTE CORPORATION, Shenzhen (CN)

(72) Inventors: Jian Hua, Shenzhen (CN); Yu Xin, Shenzhen (CN); Tong Bao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 3 days.

(21) Appl. No.: 18/293,896

(22) PCT Filed: Sep. 22, 2022

(86) PCT No.: PCT/CN2022/120379
§ 371 (c)(1),
(2) Date: Jan. 31, 2024

(87) PCT Pub. No.: WO2023/045990
PCT Pub. Date: Mar. 30, 2023

(65) Prior Publication Data
US 2024/0340210 A1    Oct. 10, 2024

(30) Foreign Application Priority Data
Sep. 23, 2021 (CN) .......................... 202111116923.X (51) Int. Cl.
*H04L 27/26* (2006.01)
(52) U.S. Cl.
CPC ...... *H04L 27/2617* (2013.01); *H04L 27/2627* (2013.01)

(58) Field of Classification Search
CPC ................... H04L 27/2617; H04L 27/2627
See application file for complete search history.

(56) References Cited

U.S. PATENT DOCUMENTS

| | | | |
|---|---|---|---|
| 2005/0229073 A1 | 10/2005 | Sudo | |
| 2007/0081604 A1* | 4/2007 | Khan | H04L 25/03828 375/261 |

(Continued)

FOREIGN PATENT DOCUMENTS

| | | |
|---|---|---|
| CA | 2757570 C | 11/2012 |
| CN | 103209053 A | 7/2013 |

(Continued)

OTHER PUBLICATIONS

International Search Report in Application No. PCT/CN2022/120379, dated Dec. 6, 2022, 5 pages, including translation.

(Continued)

*Primary Examiner* — Janice N Tieu
(74) *Attorney, Agent, or Firm* — Morgan, Lewis & Bockius LLP (57) ABSTRACT

Provided are a signal modulation method and device, and a storage medium. The method includes: generating a first bit sequence and a second bit sequence; modulating the first bit sequence with a first modulation scheme to obtain a corresponding modulation symbol including control information; and modulating the second bit sequence with a second modulation scheme to obtain a corresponding modulation symbol including data information.

17 Claims, 5 Drawing Sheets

Generate a first bit sequence and a second bit sequence — S110

Modulate the first bit sequence with a first modulation scheme to obtain a corresponding modulation symbol including control information — S120

Modulate the second bit sequence with a second modulation scheme to obtain a corresponding modulation symbol including data information — S130

(56) References Cited

U.S. PATENT DOCUMENTS

| | | |
|---|---|---|
| 2007/0165742 A1 | 7/2007 | Chen et al. |
| 2008/0192726 A1 | 8/2008 | Mahesh et al. |
| 2010/0303096 A1 | 12/2010 | Kasher et al. |
| 2012/0057449 A1* | 3/2012 | Takaoka ................ H04W 72/23 375/E1.033 |
| 2015/0010103 A1* | 1/2015 | Murakami ........... H04B 7/0413 375/267 |

FOREIGN PATENT DOCUMENTS

| | | |
|---|---|---|
| CN | 105531942 A | 4/2016 |
| CN | 106411801 A | 2/2017 |
| CN | 106603457 A | 4/2017 |
| CN | 108494718 A | 9/2018 |
| CN | 111901277 A | 11/2020 |

OTHER PUBLICATIONS

Extended European Search Report in Application No. 22872035.5, dated Sep. 10, 2025, 7 pages.

M. Barton, "Unequal error protection for wireless ATM applications", Global Telecommunications Conference, 1996. Globecom '96. 'Communications: The Key To Global Prosperity London, UK Nov. 18-22, 1996, New York, NY, USA, IEEE, US, vol. 3, Nov. 18, 1996, pp. 1911-1915, XP010220210, DOI: 10.1109/GLOCOM.1996. 591969ISBN: 978-0-7803-3336-9.

Harkirat Singh et al., "Support of Uncompressed Video Streaming Over 60GHz Wireless Networks", Consumer Communications and Networking Conference, 2008. CCNC 2008. 5TH IEEE, IEEE CCP, Piscataway, NJ, USA, Jan. 1, 2008, pp. 243-248, XP031211870, ISBN: 978-1-4244-1456-7.

* cited by examiner

SIGNAL MODULATION METHOD AND DEVICE, AND STORAGE MEDIUM

TECHNICAL FIELD

The present application relates to the field of communication, for example, a signal modulation method and device, and a storage medium.

BACKGROUND

Phase noise (PN) becomes relatively large in a high-frequency scenario. At a receiving end, phase compensation for the phase noise is performed, and the phase noise is typically estimated through a phase tracking reference signal (PTRS). However, spectral efficiency will be reduced. Therefore, how to configure a modulation scheme with which relatively high spectral efficiency, a relatively low peak-to-average power ratio (PAPR), and phase noise compensation are achieved is an urgent problem to be solved.

SUMMARY

An embodiment of the present application provides a signal modulation method applied to a transmitting end. The signal modulation method includes the steps below.

A first bit sequence and a second bit sequence are generated; the first bit sequence is modulated with a first modulation scheme so that a corresponding modulation symbol including control information is obtained; and the second bit sequence is modulated with a second modulation scheme so that a corresponding modulation symbol including data information is obtained.

An embodiment of the present application provides a signal modulation device. The signal modulation device includes a communication module, a memory, and one or more processors. The communication module is configured to perform communication interaction between a transmitting end and a receiving end. The memory is configured to store one or more programs. When the one or more programs are executed by the one or more processors, the one or more processors are caused to implement the method according to any one of the preceding embodiments.

An embodiment of the present application provides a storage medium storing a computer program, where when executed by a processor, the computer program implements the method according to any one of the preceding embodiments.

DETAILED DESCRIPTION

Embodiments of the present application are described hereinafter in conjunction with the drawings. The present application is described below in conjunction with the embodiments and the drawings, and the examples illustrated are intended only to explain the present application.

Phase noise is relatively large in a high-frequency scenario. Even if a conventional common phase error (CPE) phase compensation is performed at a receiving end, much phase noise remains. Meanwhile, a Doppler shift is relatively large in the high-frequency scenario. Even if frequency offset compensation is performed at the receiving end, some phase deviations will remain in a data symbol. Especially for some low-level terminals, the devices have larger phase noise due to low costs and poor performance.

In addition, in the high-frequency scenario, path loss and shadow attenuation are also relatively large, so signal-to-noise ratios in some areas at the edge of a cell are very low. Moreover, at a high frequency, a power amplifier (PA) has relatively low efficiency. In order that a signal-to-noise ratio is improved and the power consumption of the battery of a user equipment (UE) is reduced, the PAPR of a signal transmitted by the UE needs to be reduced. In the 5G New Radio (NR), in order to send a signal with a lower PAPR, a discrete Fourier transform-spread orthogonal frequency-division multiplexing (DFT-s-OFDM) waveform is typically used. Since the data of the signal is mapped in a time domain, the PAPR is lower than cyclic prefix-orthogonal frequency-division multiplexing (CP-OFDM). In an NR protocol, PTRSs of a single carrier are configured in the manner of grouping and uniform insertion. This configuration manner is relatively single and has the disadvantages of having low spectrum utilization, affecting PAPR performance, reducing spectral efficiency, and the like.

How to configure a modulation scheme with which relatively high spectral efficiency, a relatively low PAPR, and phase noise compensation are achieved is an urgent problem to be solved.

Figure 1:
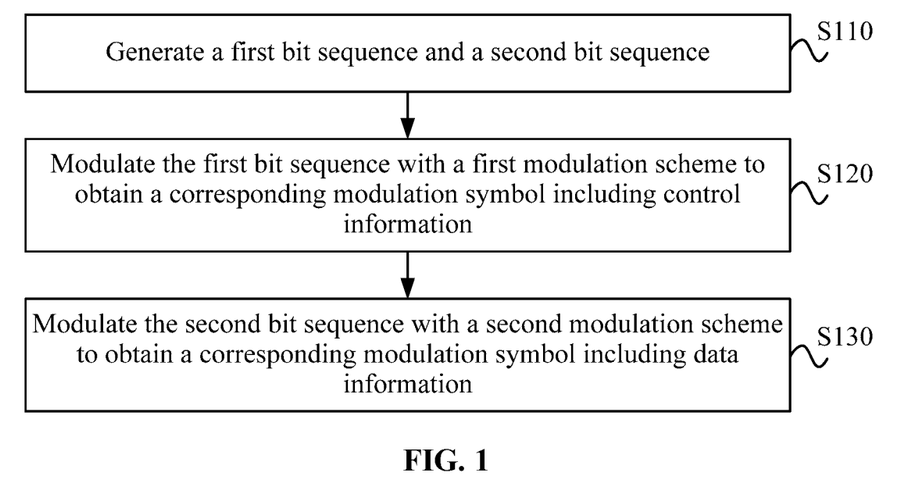
FIG. 1 is a flowchart of a signal modulation method according to an embodiment of the present application.

In an embodiment, FIG. 1 is a flowchart of a signal modulation method according to an embodiment of the present application. This embodiment may be implemented by a signal modulation device. The signal modulation device may be a transmitting end. As shown in FIG. 1, the signal modulation method in this embodiment includes S110 to S130.

In S110, a first bit sequence and a second bit sequence are generated.

In an embodiment, both the first bit sequence and the second bit sequence are sequences obtained after coding. In an embodiment, the sequence length and the sequence type corresponding to the first bit sequence may be different from the sequence length and the sequence type corresponding to the second bit sequence. For example, the first bit sequence and the second bit sequence are represented by c1(n1) and c2 n2), respectively, where n1 and n2 represent the sequence length of the first bit sequence and the sequence length of the second bit sequence, respectively, and n1 and n2 may be the same or different. In an embodiment, the sequence type of the first bit sequence may also be different from the sequence type of the second bit sequence. For example, the first bit sequence is a bit sequence corresponding to control information, and the second bit sequence is a bit sequence corresponding to data information.

In S120, the first bit sequence is modulated with a first modulation scheme so that a corresponding modulation symbol including the control information is obtained.

In S130, the second bit sequence is modulated with a second modulation scheme so that a corresponding modulation symbol including the data information is obtained.

In an embodiment, the first bit sequence and the second bit sequence are modulated with different modulation schemes separately so that the corresponding modulation symbol including the control information and the corresponding modulation symbol including the data information are obtained. For example, assuming that the first modulation scheme is a modulation scheme A and the second modulation scheme is a modulation scheme B, the first bit sequence c1(n1) may be modulated with the modulation scheme A so that the modulation symbol s1(k1) including the control information is obtained, and the second bit sequence c2(n2) may be modulated with the modulation scheme B so that the modulation symbol s2(k2) including the data information is obtained. In an embodiment, with the performance characteristics of the two different modulation schemes, different functions may be allocated to data.

Concerning an order in which S120 and S130 are performed, S120 may be performed after S130, S130 may be performed after S120, or S120 and S130 may be performed simultaneously, which is not limited. The modulation may be performed according to actual conditions.

In an embodiment, the signal modulation method further includes transmitting the modulation symbol including the control information and the modulation symbol including the data information to a receiving end. In an embodiment, the transmitting end may transmit the modulation symbol including the control information and the modulation symbol including the data information to the receiving end in a time domain or a frequency domain so that the receiving end demodulates the modulation symbols.

In an embodiment, generating the first bit sequence and the second bit sequence includes: coding first bit information to obtain the corresponding first bit sequence; and coding second bit information to obtain the corresponding second bit sequence. In an embodiment, the first bit information and the second bit information may be separately coded independently so that the corresponding first bit sequence and the corresponding second bit sequence are obtained. In an embodiment, the first bit information and the second bit information may be jointly coded so that the corresponding first bit sequence and the corresponding second bit sequence are obtained. When the first bit information and the second bit information are separately coded independently, the first bit information and the second bit information may be independently coded at the same code rate or different code rates. Before the first bit sequence and the second bit sequence are modulated, the first bit information and the second bit information are coded separately so that the corresponding first bit sequence and the corresponding second bit sequence are obtained. For example, it is assumed that the first bit information is represented by [b1(m1)] and the second bit information is represented by [b2(m2)], where m1 and m2 represent the length of the first bit information and the length of the second bit information, respectively, and m1 and m2 may be the same or different. Before the modulation, [b1(m1)] and [b2(m2)] are separately coded independently or coded jointly so that the corresponding c1(n1) and the corresponding c2(n2) are obtained. In an embodiment, the first bit information and the second bit information are separately coded independently so that data of the different modulation schemes does not affect each other's reliability, and a code rate may be changed so that the reliability of the data can be further adjusted.

In an embodiment, the modulation symbols are transmitted in the time domain, and an insertion manner between the control information and the data information includes: grouping the control information to obtain at least two control information groups; and inserting the at least two control information groups into the data information non-uniformly, where each control information group has the same amount of data. In an embodiment, in the case where the transmitting end transmits the modulation symbol of the control information and the modulation symbol of the data information to the receiving end in the time domain, the control information groups obtained through the modulation with the first modulation scheme may be non-uniformly inserted into the data information obtained through the modulation with the second modulation scheme, where the at least two control information groups obtained through grouping the control information have the same amount of data.

In an embodiment, the modulation symbols are transmitted in the time domain, and an insertion manner between the control information and the data information includes: grouping the control information to obtain two control information groups; and inserting the control information groups at two ends of the data information separately, where the two control information groups have the same amount of data or different amounts of data. In the embodiment, in the case where the transmitting end transmits the modulation symbol of the control information and the modulation symbol of the data information to the receiving end in the time domain, the control information obtained through the modulation with the first modulation scheme may be divided into two groups, that is, the two control information groups are obtained, and then the two control information groups are separately inserted at the two ends of the data information obtained through the modulation with the second modulation scheme, where the two control information groups may have the same amount of data or different amounts of data.

In an embodiment, the modulation symbols are transmitted in the time domain, and an insertion manner between the control information and the data information includes: grouping the control information to obtain at least two control information groups; and inserting the control information groups into the data information uniformly, where the two control information group have different amounts of data. In an embodiment, in the case where the transmitting end transmits the modulation symbol of the control information and the modulation symbol of the data information to the receiving end in the time domain, the control information groups obtained through the modulation with the first modulation scheme may be uniformly inserted into the data information obtained through the modulation with the second modulation scheme, where the at least two control information groups obtained through grouping the control information may have different amounts of data. In an embodiment, the first modulation scheme is a low-order modulation scheme with a low PAPR.

In an embodiment, in the case where the modulation symbols are transmitted in the time domain, different insertion manners between the control information and the data information are used. For the data transmitted in the time domain, a common phase error (CPE) and inter-carrier interference (ICI) may be estimated through low-order modulation.

In an embodiment, the modulation symbols are transmitted in the frequency domain, and an insertion manner between the control information and the data information includes: inserting the control information into the data information by using the control information as a group of consecutive sequences. In the embodiment, in the case where the transmitting end transmits the modulation symbol of the control information and the modulation symbol of the data information to the receiving end in the frequency domain, the control information obtained through the modulation with the first modulation scheme may be used as the group of consecutive sequences and inserted into the data information obtained through the modulation with the second modulation scheme. In an embodiment, the first modulation scheme is the low-order modulation scheme with the low PAPR. In an embodiment, for the data transmitted in the frequency domain, the CPE may be estimated through the low-order modulation.

In an embodiment, the first modulation scheme is the low-order modulation scheme with the low peak-to-average power ratio (PAPR), and the second modulation scheme is a high-order modulation scheme.

In an embodiment, the first modulation scheme includes one of: $\pi/4$ binary phase shift keying ($\pi/4$-BPSK) modulation, $\pi/2$-BPSK modulation, quadrature phase-shift keying (QPSK) modulation, 1+D $\pi/2$-BPSK modulation, or 1+D $\pi/4$-BPSK modulation. In an embodiment, the process where the $\pi/4$-BPSK modulation scheme is determined includes: performing an interpolation operation between two adjacent modulation symbols on the basis of the $\pi/2$-BPSK modulation, where an interpolated phase is the phase average of two adjacent symbols, and an interpolation modulus is the same as a modulus of a $\pi/2$-BPSK modulation symbol.

In an embodiment, the second modulation scheme includes one of 16 quadrature amplitude modulation (QAM), 64-QAM, or 256-QAM.

In an embodiment, the 1+D $\pi/2$-BPSK modulation scheme includes performing a convolution operation on time-domain data and $[\sqrt{2}, \sqrt{2}]$ on the basis of the $\pi/2$-BPSK modulation scheme to obtain the 1+D $\pi/2$-BPSK modulation scheme.

In an embodiment, the 1+D $\pi/4$-BPSK modulation scheme includes performing a convolution operation on time-domain data and $[\sqrt{2}, \sqrt{2}]$ on the basis of the $\pi/4$-BPSK modulation scheme, to obtain the 1+D $\pi/4$-BPSK modulation scheme.

In an embodiment, the first modulation scheme is the $\pi/2$-BPSK modulation, where modulation symbols of the control information at odd positions in each data block are located in a second quadrant of a constellation diagram and a fourth quadrant of the constellation diagram, and modulation symbols of the control information at even positions in each data block are located in a first quadrant of the constellation diagram and a third quadrant of the constellation diagram. In an embodiment, modulation symbols of a data sequence (for example, the control information [s1 (k1)]) obtained through the modulation with the first modulation scheme at the odd positions in each data block are in the second quadrant of the constellation diagram and the fourth quadrant of the constellation diagram, and modulation symbols of the data sequence at the even positions in each data block are in the first quadrant of the constellation diagram and the third quadrant of the constellation diagram. Thus, for the data transmitted in the time domain, a PN can be resisted through the low-order modulation so that the PN is estimated.

In an embodiment, in multi-carrier frequency-domain modulation, consecutive control information is included in each orthogonal frequency-division multiplexing (OFDM) symbol.

In an embodiment, in single-carrier frequency-domain modulation, grouped control information is included in each OFDM symbol.

In an embodiment, the data of the first modulation scheme is used for transmitting the control information. In an embodiment, during the multi-carrier frequency-domain modulation, there are a block of consecutive resources in each symbol which are used for transmitting the control information. In an embodiment, during single-carrier time-domain modulation, there are some grouped resources in each symbol which are used for transmitting the control information. The control information is transmitted through the low-order modulation so that reliability is higher and the phase noise can be estimated through this control information.

In an embodiment, within a certain number of slots, each of a head and a tail in each data block is the control information of the first modulation scheme, all data blocks in each slot have the same head control information, and all the data blocks in each slot have the same tail control information. For example, in n slots, the head in each data block is the control information of the first modulation scheme and all the data blocks have the same head control information, and the tail in each data block is the control information of the first modulation scheme and all the data blocks have the same tail control information, where n is a positive integer greater than or equal to 1. In the embodiment, the effect of the CP can be replaced by the control information, thereby saving resources.

In an embodiment, the control information is replaced with the data information.

In an embodiment, the first modulation scheme and the second modulation scheme are applicable to configuration in a waveform of a single-carrier type such as DFT-s-OFDM and SC-QAM and are also applicable to configuration in a waveform of a multi-carrier type such as CP-OFDM.

In an embodiment, the step in which the modulation symbols obtained after the modulation may be transmitted on a physical resource includes: transmitting the modulation symbols directly in the time domain; or performing operations such as filtering and digital-to-analog conversion on the modulation symbols and then transmitting the modulation symbols on a radio frequency link.

In an embodiment, the step in which the modulation symbols obtained after the modulation may be transmitted on a physical resource includes: performing operations such as a DFT, an inverse discrete Fourier transform (IDFT), and digital-to-analog conversion on the modulation symbols and then transmitting the modulation symbols on a radio frequency link.

In an embodiment, before the data sequence obtained after the modulation (for example, the control information s1(k1) and the data information s2(k2)) is carried on a physical time-frequency resource for transmission, other operations may further be included, such as adding a reference sequence, filtering, or the like in the data sequence [s(k)], at two ends of the data sequence, or in the middle of the data sequence.

Figure 2:
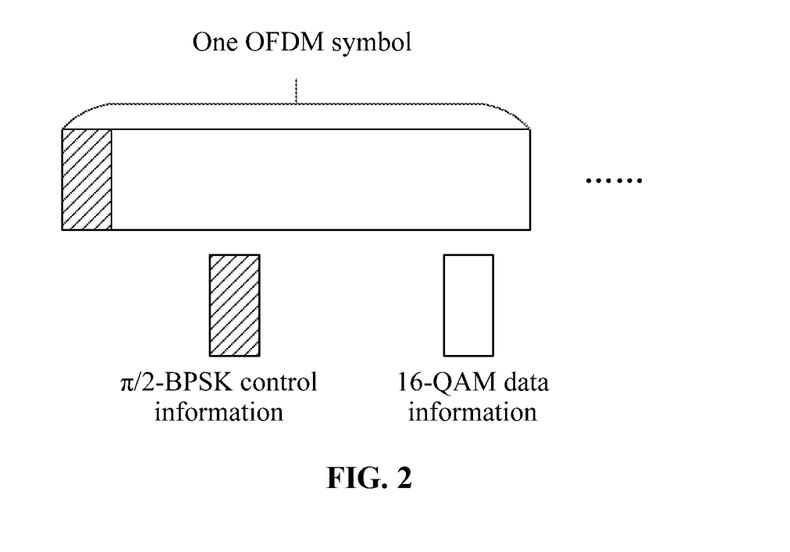
FIG. 2 is a schematic diagram showing a configuration of an OFDM symbol according to an embodiment of the present application.

In an embodiment, a signal modulation process is described by using an example in which a modulation scheme is applied in one OFDM symbol on a multi-carrier CP-OFDM waveform, the modulation symbol is transmitted in the frequency domain, the first modulation scheme is π/2-BPSK, the second modulation scheme is 16-QAM, the first bit sequence is modulated so that the control information is obtained, and the second bit sequence is modulated so that the data information is obtained. FIG. 2 is a schematic diagram showing a configuration of an OFDM symbol according to an embodiment of the present application. As shown in FIG. 2, a data modulation process in the OFDM symbol in the frequency domain of the multi-carrier CP-OFDM waveform is described below.

In the frequency domain, the OFDM symbol consists of two parts, and the two parts are the control information [s1(k1)] whose first modulation scheme is π/2-BPSK and the data information [s2(k2)] whose second modulation scheme is 16-QAM separately, where a control information bit [b1(k1)] is coded and modulated such that [s1(k1)] is obtained, and a data information bit [b2(k2)] is coded and modulated such that [s2(k2)] is obtained. The control information [s1(k1)] is used as a group of consecutive sequences and inserted on the left side of the data information [s2(k2)].

Then, operations such as the addition of a zero subcarrier, an IDFT, and a CP are performed on this frequency-domain data.

Figure 3:
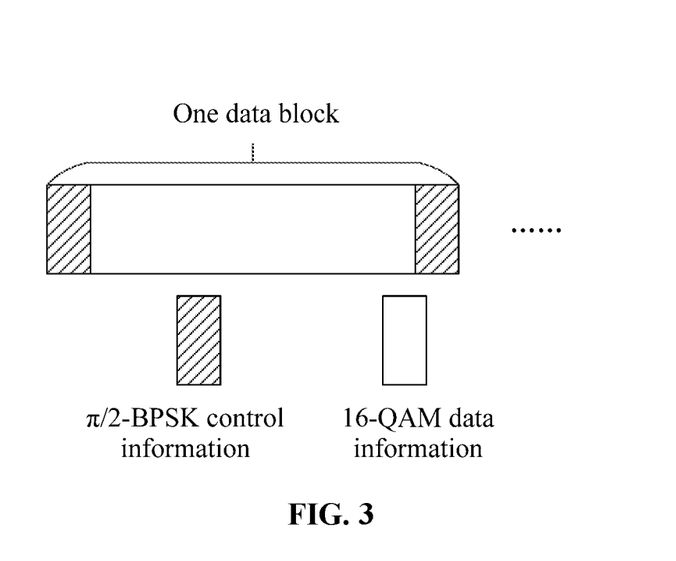
FIG. 3 is a schematic diagram showing a configuration of a data block according to an embodiment of the present application.

In an embodiment, a signal modulation process is described by using an example in which a modulation scheme is applied in one data block on a single-carrier SC-QAM waveform, the modulation symbol is transmitted in the time domain, the first modulation scheme is π/2-BPSK, the second modulation scheme is 16-QAM, the control information is inserted at the two ends of the data information, the first bit sequence is modulated so that the control information is obtained, and the second bit sequence is modulated so that the data information is obtained. FIG. 3 is a schematic diagram showing a configuration of a data block according to an embodiment of the present application. As shown in FIG. 3, a data modulation process in the data block in the time domain of the single-carrier SC-QAM waveform is described below.

In the time domain, the data block consists of two parts, and the two parts are the control information [s1(k1)] whose first modulation scheme is pi/2-BPSK and the data information [s2(k2)] whose second modulation scheme is 16-QAM separately, where a control information bit [b1(k1)] is coded and modulated such that [s1(k1)] is obtained, and a data information bit [b2 (k2)] is coded and modulated such that [s2(k2)] is obtained. Since the change of the phase noise is relatively slow, the control information [s1(k1)] is divided into two groups of consecutive sequences to be inserted on two sides of the data information [s2(k2)].

Then, operations such as the addition of a CP are performed on this time-domain data.

Figure 4:
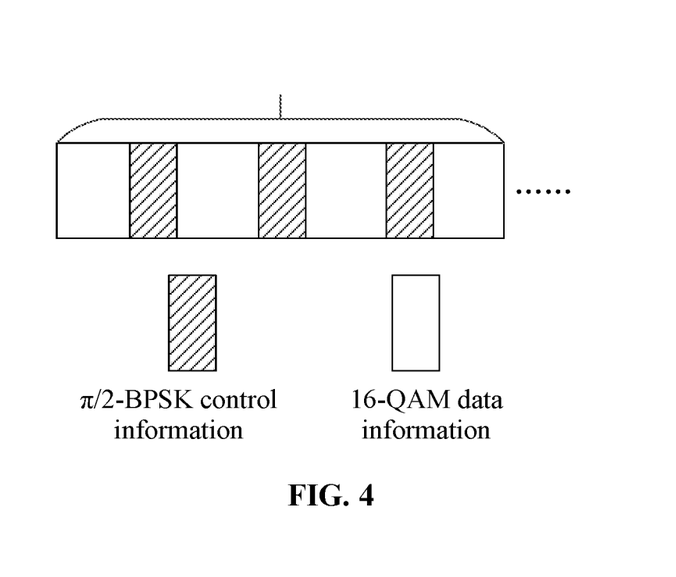
FIG. 4 is a schematic diagram showing a configuration of another data block according to an embodiment of the present application.

In an embodiment, a signal modulation process is described by using an example in which a modulation scheme is applied in one data block on a single-carrier SC-QAM waveform, the modulation symbol is transmitted in the time domain, the first modulation scheme is π/2-BPSK, the second modulation scheme is 16-QAM, the control information is divided into three groups to be uniformly inserted into the middle of the data information, the first bit sequence is modulated so that the control information is obtained, and the second bit sequence is modulated so that the data information is obtained. FIG. 4 is a schematic diagram showing a configuration of another data block according to an embodiment of the present application. As shown in FIG. 4, a data modulation process in the data block in the time domain of the single-carrier SC-QAM waveform is described below.

In the time domain, the data block consists of two parts, and the two parts are the control information [s1(k1)] whose first modulation scheme is pi/2-BPSK and the data information [s2(k2)] whose second modulation scheme is 16-QAM separately, where a control information bit [b1(k1)] is coded and modulated such that [s1(k1)] is obtained, and a data information bit [b2 (k2)] is coded and modulated such that [s2(k2)] is obtained. Since the change of the phase noise is relatively fast, the control information [s1(k1)] is divided into three groups of consecutive sequences to be uniformly inserted into the middle of the data information [s2(k2)].

Then, operations such as the addition of a CP are performed on this time-domain data.

Figure 5:
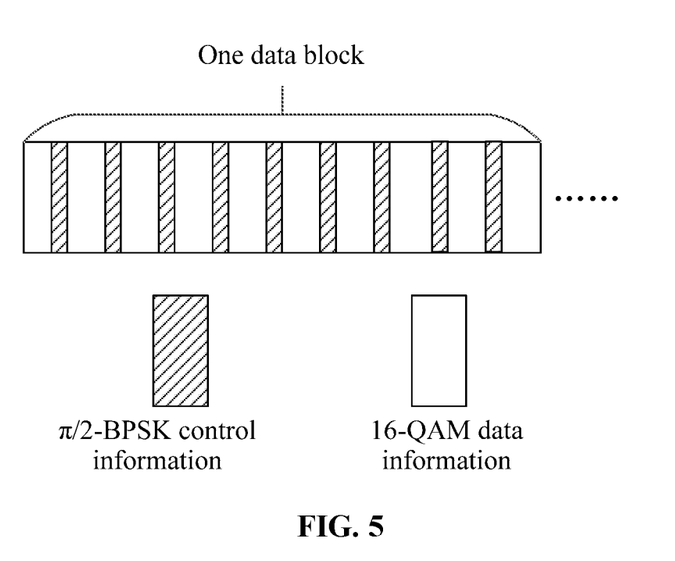
FIG. 5 is a schematic diagram showing a configuration of another data block according to an embodiment of the present application.

In an embodiment, a signal modulation process is described by using an example in which a modulation scheme is applied in one data block on a single-carrier SC-QAM waveform, the modulation symbol is transmitted in the time domain, the first modulation scheme is π/2-BPSK, the second modulation scheme is 16-QAM, the control information is divided into nine groups to be uniformly inserted into the middle of the data information, the first bit sequence is modulated so that the control information is obtained, and the second bit sequence is modulated so that the data information is obtained. FIG. 5 is a schematic diagram showing a configuration of another data block according to an embodiment of the present application. As shown in FIG. 5, a data modulation process in the data block in the time domain of the single-carrier SC-QAM waveform is described below.

In the time domain, the data block consists of two parts, and the two parts are the control information [s1(k1)] whose first modulation scheme is π/2-BPSK and the data information [s2(k2)] whose second modulation scheme is 16-QAM separately, where a control information bit [b1(k1)] is coded and modulated such that [s1(k1)] is obtained, and a data information bit [b2(k2)] is coded and modulated such that [s2(k2)] is obtained. Since the change of the phase noise is relatively fast, the control information [s1(k1)] is divided into nine groups of consecutive sequences to be uniformly inserted into the middle of the data information [s2(k2)].

Then, operations such as the addition of a CP are performed on this time-domain data.

Figure 6:
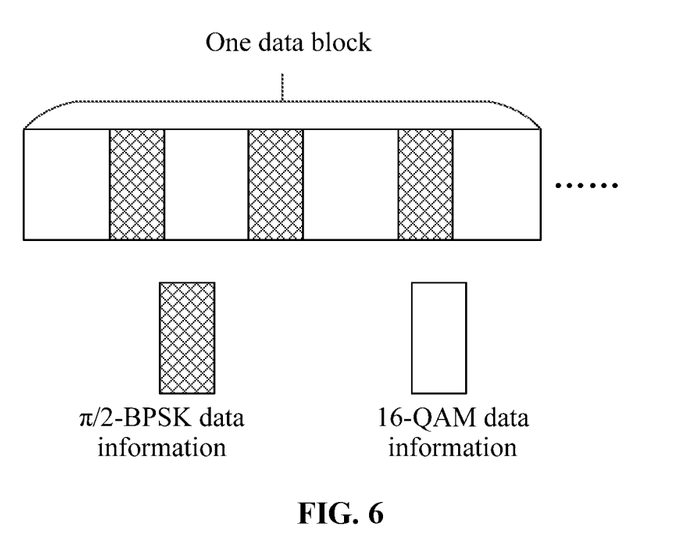
FIG. 6 is a schematic diagram showing a configuration of another data block according to an embodiment of the present application.

In an embodiment, a signal modulation process is described by using an example in which a modulation scheme is applied in one data block on a single-carrier SC-QAM waveform, the modulation symbol is transmitted in the time domain, the first modulation scheme is π/2-BPSK, the second modulation scheme is 16-QAM, the data information is divided into three groups to be uniformly inserted into the middle of another data information, the first bit sequence is modulated so that the data information is obtained, and the second bit sequence is modulated so that the data information is obtained. FIG. 6 is a schematic diagram showing a configuration of another data block according to an embodiment of the present application. As shown in FIG. 6, a data modulation process in the data block in the time domain of the single-carrier SC-QAM waveform is described below.

In the time domain, the data block consists of two parts, and the two parts are data information [s1(k1)] whose modulation scheme is π/2-BPSK and the data information [s2(k2)] whose modulation scheme is 16-QAM separately, where a data information bit [b1(k1)] is coded and modulated such that [s1(k1)] is obtained, and a data information bit [b2(k2)] is coded and modulated such that [s2(k2)] is obtained. Since the change of the phase noise is relatively fast, the data information [s1(k1)] is divided into three groups of consecutive sequences to be uniformly inserted into the middle of the data information [s2(k2)].

Then, operations such as the addition of a CP are performed on this time-domain data.

Figure 7:
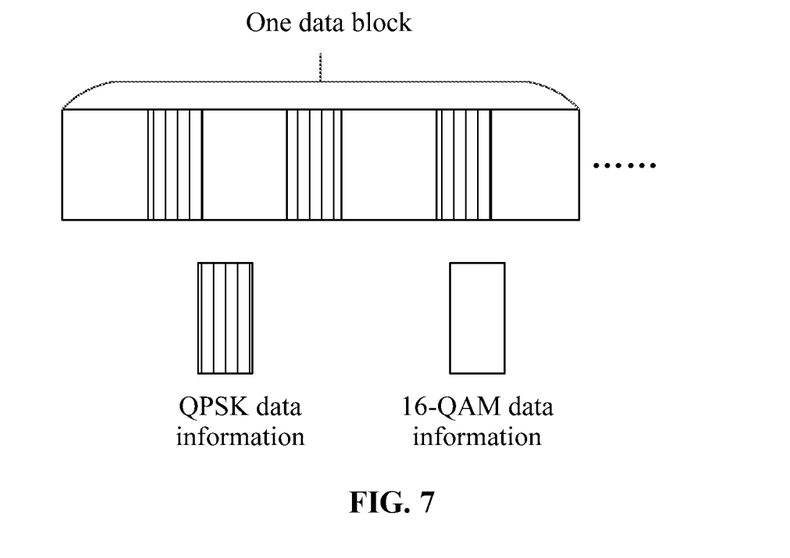
FIG. 7 is a schematic diagram showing a configuration of another data block according to an embodiment of the present application.

In an embodiment, a signal modulation process is described by using an example in which a modulation scheme is applied in one data block on a single-carrier SC-QAM waveform, the modulation symbol is transmitted in the time domain, the first modulation scheme is QPSK, the second modulation scheme is 16-QAM, the data information is divided into three groups to be uniformly inserted into the middle of another data information, the first bit sequence is modulated so that the data information is obtained, and the second bit sequence is modulated so that the data information is obtained. FIG. 7 is a schematic diagram showing a configuration of another data block according to an embodiment of the present application. As shown in FIG. 7, a data modulation process in the data block in the time domain of the single-carrier SC-QAM waveform is described below.

In the time domain, the data block consists of two parts, and the two parts are data information [s1(k1)] whose first modulation scheme is QPSK and the data information [s2(k2)] whose second modulation scheme is 16-QAM separately, where a data information bit [b1(k1)] is coded and modulated such that [s1(k1)] is obtained, and a data information bit [b2(k2)] is coded and modulated such that [s2(k2)] is obtained. Since the change of the phase noise is relatively fast, the data information [s1(k1)] is divided into three groups of consecutive sequences to be uniformly inserted into the middle of the data information [s2(k2)].

Then, operations such as the addition of a CP are performed on this time-domain data.

Figure 8:
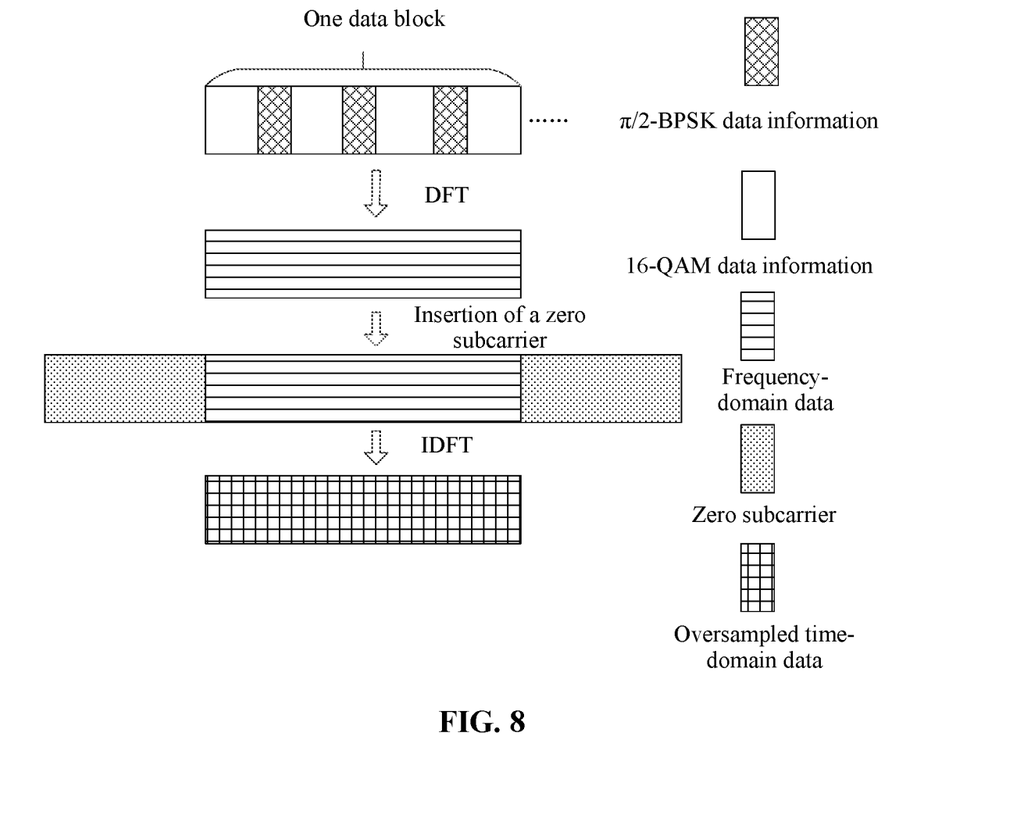
FIG. 8 is a schematic diagram showing a configuration of another data block according to an embodiment of the present application.

In an embodiment, a signal modulation process is described by using an example in which a modulation scheme is applied in one data block on a single-carrier DFT-s-OFDM waveform, the modulation symbol is transmitted in the time domain, the first modulation scheme is π/2-BPSK, the second modulation scheme is 16-QAM, the data information is divided into three groups to be uniformly inserted into the middle of another data information, the first bit sequence is modulated so that the data information is obtained, and the second bit sequence is modulated so that the data information is obtained. FIG. 8 is a schematic diagram showing a configuration of another data block according to an embodiment of the present application. As shown in FIG. 8, a data modulation process in the data block in the time domain of the single-carrier DFT-s-OFDM waveform is described below.

In the time domain, the data block consists of two parts, and the two parts are data information [s1(k1)] whose modulation scheme is π/2-BPSK and the data information [s2(k2)] whose modulation scheme is 16-QAM separately, where a data information bit [b1(k1)] is coded and modulated such that [s1(k1)] is obtained, and a data information bit [b2(k2)] is coded and modulated such that [s2(k2)] is obtained. Since the change of the phase noise is relatively fast, the data information [s1(k1)] is divided into three groups of consecutive sequences to be uniformly inserted into the middle of the data information [s2(k2)].

Then, the DFT is performed on this time-domain data so that the time-domain data is transformed into the frequency domain. Then, a zero subcarrier is inserted, and the IDFT is performed so that oversampled time-domain data is obtained.

Then, operations such as the addition of a CP are performed on this time-domain data.

Figure 9:
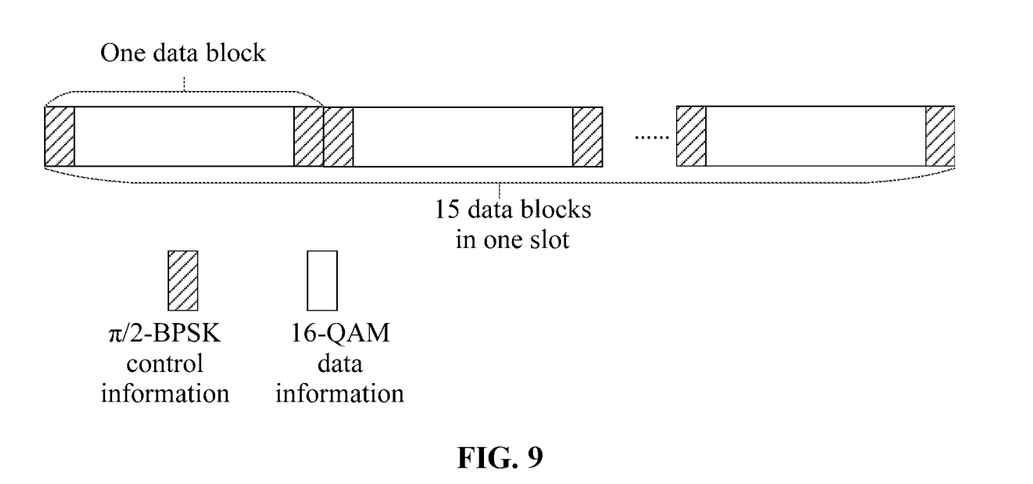
FIG. 9 is a schematic diagram showing a configuration of another data block according to an embodiment of the present application.

In an embodiment, a signal modulation process is described by using an example in which a modulation scheme is applied in one data block on a single-carrier SC-QAM waveform, the modulation symbol is transmitted in the time domain, the first modulation scheme is π/2-BPSK, the second modulation scheme is 16-QAM, the control information is divided into two groups to be inserted on two sides of the data information, the first bit sequence is modulated so that the control information is obtained, and the second bit sequence is modulated so that the data information is obtained. FIG. 9 is a schematic diagram showing a configuration of another data block according to an embodiment of the present application. As shown in FIG. 9, a data modulation process in the data block in the time domain of the single-carrier SC-QAM waveform is described below.

In the time domain, the data block consists of two parts, and the two parts are the control information [s1(k1)] whose first modulation scheme is pi/2-BPSK and the data information [s2(k2)] whose second modulation scheme is 16-QAM separately, where a control information bit [b1(k1)] is coded and modulated such that [s1(k1)] is obtained, and a data information bit [b2(k2)] is coded and modulated such that [s2(k2)] is obtained. Since the change of the phase noise is relatively slow, the control information [s1(k1)] is divided into two groups of consecutive sequences to be inserted on two sides of the data information [s2(k2)]. In addition, one slot includes 15 data blocks, all the data blocks in the slot have the same head control information, and all the data blocks in the slot have the same tail control information. The head control information and the tail control information are both used as CPs.

Figure 10:
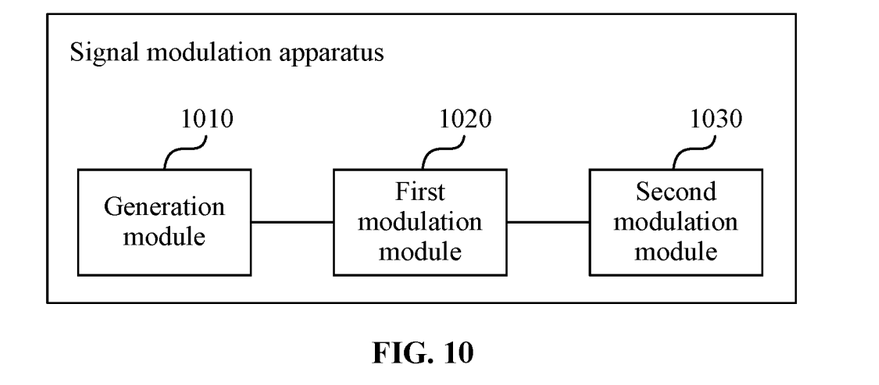
FIG. 10 is a block diagram of a signal modulation apparatus according to an embodiment of the present application.

In an embodiment, FIG. 10 is a block diagram of a signal modulation apparatus according to an embodiment of the present application. This embodiment is applied to a signal modulation device. As shown in FIG. 10, the signal modulation apparatus in this embodiment includes a generation module 1010, a first modulation module 1020, and a second modulation module 1030.

The generation module 1010 is configured to generate a first bit sequence and a second bit sequence. The first modulation module 1020 is configured to modulate the first bit sequence with a first modulation scheme to obtain a corresponding modulation symbol including control information. The second modulation module 1030 is configured to modulate the second bit sequence with a second modulation scheme to obtain a corresponding modulation symbol including data information.

In an embodiment, the signal modulation apparatus further includes a transmission module.

The transmission module is configured to transmit the modulation symbol including the control information and the modulation symbol including the data information to a receiving end.

In an embodiment, the generation module 1010 includes a first coding unit and a second coding unit.

The first coding unit is configured to code first bit information to obtain the first bit sequence, and the second coding unit is configured to code second bit information to obtain the second bit sequence.

In an embodiment, the modulation symbols are transmitted in a time domain, and an insertion manner between the control information and the data information includes the operations below.

The control information is grouped so that at least two control information groups are obtained, and the control information groups are inserted into the data information non-uniformly, where each control information group has the same amount of data.

In an embodiment, the modulation symbols are transmitted in a time domain, and an insertion manner between the control information and the data information includes the operations below.

The control information is grouped so that two control information groups are obtained, and the control information groups are inserted at two ends of the data information separately, where each control information group has the same amount of data or a different amount of data.

In an embodiment, the modulation symbols are transmitted in a time domain, and an insertion manner between the control information and the data information includes the operations below.

The control information is grouped so that at least two control information groups are obtained, and the control information groups are inserted into the data information uniformly, where each control information group has the same amount of data.

In an implementation, the modulation symbols are transmitted in a frequency domain, and an insertion manner between the control information and the data information includes the operation below.

The control information is used as a group of consecutive sequences and the control information is inserted into the data information.

In an embodiment, the first modulation scheme is a low-order modulation scheme with a low peak-to-average power ratio (PAPR), and the second modulation scheme is a high-order modulation scheme.

In an embodiment, the first modulation scheme includes one of $\pi/4$ binary phase shift keying ($\pi/4$-BPSK) modulation, $\pi/2$-BPSK modulation, quadrature phase-shift keying (QPSK) modulation, 1+D $\pi/2$-BPSK modulation, or 1+D $\pi/4$-BPSK modulation.

In an embodiment, the second modulation scheme includes one of 16 quadrature amplitude modulation (QAM), 64-QAM, or 256-QAM.

In an embodiment, the $\pi/4$-BPSK modulation scheme includes performing an interpolation operation between two adjacent modulation symbols on the basis of the $\pi/2$-BPSK modulation scheme to obtain the $\pi/4$-BPSK modulation scheme, where an interpolated phase is the phase average of the two adjacent symbols, and an interpolation modulus is the same as the modulus of a $\pi/2$-BPSK modulation symbol.

In an embodiment, the 1+D $\pi/2$-BPSK modulation scheme includes performing a convolution operation on time-domain data and $[\sqrt{2}, \sqrt{2}]$ on the basis of the $\pi/2$-BPSK modulation scheme to obtain the 1+D $\pi/2$-BPSK modulation scheme.

In an embodiment, the 1+D $\pi/4$-BPSK modulation scheme includes performing a convolution operation on time-domain data and $[\sqrt{2}, \sqrt{2}]$ on the basis of the $\pi/4$-BPSK modulation scheme to obtain the 1+D $\pi/4$-BPSK modulation scheme.

In an embodiment, the first modulation scheme is the $\pi/2$-BPSK modulation, where modulation symbols of the control information at odd positions in each data block are located in a second quadrant of a constellation diagram and a fourth quadrant of the constellation diagram, and modulation symbols of the control information at even positions in each data block are located in a first quadrant of the constellation diagram and a third quadrant of the constellation diagram.

In an embodiment, in multi-carrier frequency-domain modulation, consecutive control information is included in each orthogonal frequency-division multiplexing (OFDM) symbol.

In an embodiment, in single-carrier frequency-domain modulation, grouped control information is included in each OFDM symbol.

In an embodiment, within a certain number of slots, each of a head and a tail in each data block is the control information of the first modulation scheme, all data blocks in each slot have the same head control information, and all the data blocks in each slot have the same tail control information.

In an embodiment, the control information is replaced with the data information.

The signal modulation apparatus provided by this embodiment is configured to implement the signal modulation method in the embodiment shown in FIG. 1 and has similar implementation principles and technical effects, which are not repeated here.

Figure 11:
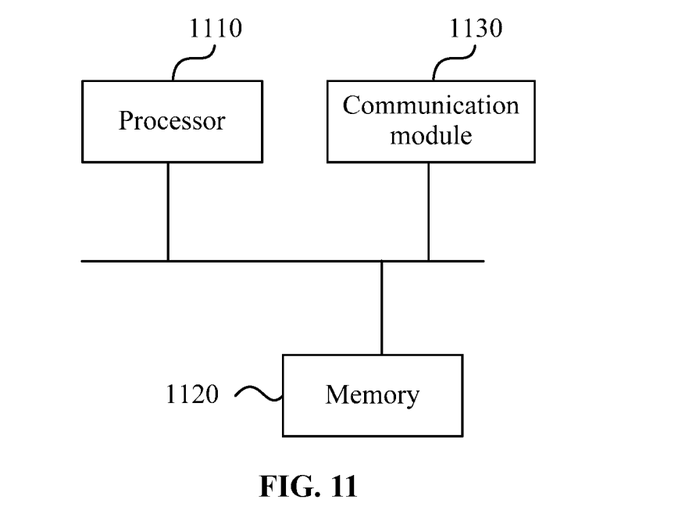
FIG. 11 is a structural diagram of a signal modulation device according to an embodiment of the present application.

FIG. 11 is a structural diagram of a signal modulation device according to an embodiment of the present application. As shown in FIG. 11, the signal modulation device provided by the present application includes a processor 1110, a memory 1120, and a communication module 1130. One or more processors 1110 may be included in the device. One processor 1110 is shown as an example in FIG. 11. One or more memories 1120 may be included in the device. One memory 1120 is shown as an example in FIG. 11. The processor 1110, the memory 1120, and the communication module 1130 in the device may be connected via a bus or in other manners. The connection via a bus is shown as an example in FIG. 11. In the embodiment, the device may be a terminal-side device (for example, a user equipment).

As a computer-readable storage medium, the memory 1120 may be configured to store software programs, computer-executable programs, and modules, such as program instructions/modules (for example, the generation module 1010, the first modulation module 1020, and the second modulation module 1030 in the signal modulation apparatus) corresponding to the device according to any embodiment of the present application. The memory 1120 may include a program storage region and a data storage region. The program storage region may store an operating system and an application program required by at least one function. The data storage region may store data created according to the use of the device. In addition, the memory 1120 may include a high-speed random-access memory and may further include a non-volatile memory, such as at least one disk memory, a flash memory, or another non-volatile solid-state memory. In some examples, the memory 1120 may include memories which are remotely disposed relative to the processor 1110, and these remote memories may be connected to the device via a network. Examples of the preceding network include, but are not limited to, the Internet, an intranet, a local area network, a mobile communication network, and a combination thereof.

The communication module 1130 is configured to perform communication interaction between a transmitting end and a receiving end.

In the case where the signal modulation device is the user equipment or a base station, the preceding device may be configured to perform the signal modulation method provided by any one of the preceding embodiments and has corresponding functions and effects.

An embodiment of the present application further provides a storage medium including computer-executable instructions, where when executed by a computer processor, the computer-executable instructions are used for performing a signal modulation method. The method includes: generating a first bit sequence and a second bit sequence; modulating the first bit sequence with a first modulation scheme to obtain a corresponding modulation symbol including control information; and modulating the second bit sequence with a second modulation scheme to obtain a corresponding modulation symbol including data information.

It is to be understood by those skilled in the art that the term "user equipment" encompasses any suitable type of wireless user device, for example, a mobile phone, a portable data processing apparatus, a portable web browser, or a vehicle-mounted mobile station.

Generally speaking, embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps and logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM), or an optical memory device and system (for example, a digital video disc (DVD) or a compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A signal modulation method, the method being applied to a transmitting end and comprising:
generating a first bit sequence and a second bit sequence;
modulating the first bit sequence with a first modulation scheme to obtain a corresponding modulation symbol comprising control information; and
modulating the second bit sequence with a second modulation scheme to obtain a corresponding modulation symbol comprising data information;
wherein in response to the modulation symbol comprising the control information and the modulation symbol comprising the data information are transmitted in a time domain, and an insertion manner between the control information and the data information comprises:
grouping the control information to obtain at least two control information groups and inserting the at least two control information groups into the data information non-uniformly, wherein the at least two control information groups have a same amount of data; or
grouping the control information to obtain two control information groups; and inserting the two control information groups at two ends of the data information separately, wherein the two control information groups have a same amount of data or different amounts of data.

2. The method according to claim 1, further comprising: transmitting the modulation symbol comprising the control information and the modulation symbol comprising the data information to a receiving end.

3. The method according to claim 1, wherein generating the first bit sequence and the second bit sequence comprises:
coding first bit information to obtain the first bit sequence; and
coding second bit information to obtain the second bit sequence.

4. The method according to claim 1, wherein in response to the modulation symbol comprising the control information and the modulation symbol comprising the data information are transmitted in a frequency domain, and an insertion manner between the control information and the data information comprises:
inserting the control information into the data information by using the control information as a group of consecutive sequences.

5. The method according to claim 1, wherein the first modulation scheme is a low-order modulation scheme with a low peak-to-average power ratio (PAPR), and the second modulation scheme is a high-order modulation scheme.

6. The method according to claim 1, wherein the first modulation scheme comprises one of: a $\pi/4$ binary phase shift keying ($\pi/4$-BPSK) modulation scheme, a $\pi/2$-BPSK modulation scheme, a quadrature phase-shift keying (QPSK) modulation scheme, a 1+D $\pi/2$-BPSK modulation scheme, or a 1+D $\pi/4$-BPSK modulation scheme.

7. The method according to claim 1, wherein the second modulation scheme comprises one of: 16 quadrature amplitude modulation (QAM), 64-QAM, or 256-QAM.

8. The method according to claim 6, wherein the $\pi/4$-BPSK modulation scheme comprises: performing an interpolation operation between two adjacent modulation symbols on a basis of the $\pi/2$-BPSK modulation scheme to obtain the $\pi/4$-BPSK modulation scheme, wherein an interpolated phase is a phase average of two adjacent modulation symbols, and an interpolation modulus is the same as a modulus of a $\pi/2$-BPSK modulation symbol.

9. The method according to claim 6, wherein the 1+D $\pi/2$-BPSK modulation scheme comprises: performing a convolution operation on time-domain data and $[\sqrt{2}, \sqrt{2}]$ on a basis of the π/2-BPSK modulation scheme to obtain the 1+D π/2-BPSK modulation scheme.

10. The method according to claim 6, wherein the 1+D π/4-BPSK modulation scheme comprises: performing a convolution operation on time-domain data and [√2, √2] on a basis of the π/4-BPSK modulation scheme to obtain the 1+D π/4-BPSK modulation scheme.

11. The method according to claim 6, wherein the first modulation scheme is the π/2-BPSK modulation scheme, wherein modulation symbols of the control information at odd positions in each data block are located in a second quadrant of a constellation diagram and a fourth quadrant of the constellation diagram, and modulation symbols of the control information at even positions in the each data block are located in a first quadrant of the constellation diagram and a third quadrant of the constellation diagram.

12. The method according to claim 1, wherein in multi-carrier frequency-domain modulation, consecutive control information is comprised in each orthogonal frequency-division multiplexing (OFDM) symbol.

13. The method according to claim 1, wherein in single-carrier time-domain modulation, grouped control information is comprised in each orthogonal frequency-division multiplexing (OFDM) symbol.

14. The method according to claim 1, wherein within a certain number of slots, each of a head and a tail in each data block is the control information of the first modulation scheme, all data blocks in each slot have same head control information, and all the data blocks in the each slot have same tail control information.

15. The method according to claim 1, wherein the control information is replaced with the data information.

16. A signal modulation device, comprising a communication module, a memory, and at least one processor;
wherein the communication module is configured to perform communication interaction between a transmitting end and a receiving end;
the memory is configured to store at least one program; and
when the at least one program is executed by the at least one processor, the at least one processor is caused to implement:
generating a first bit sequence and a second bit sequence;
modulating the first bit sequence with a first modulation scheme to obtain a corresponding modulation symbol comprising control information; and
modulating the second bit sequence with a second modulation scheme to obtain a corresponding modulation symbol comprising data information;
wherein in response to the modulation symbol comprising the control information and the modulation symbol comprising the data information are transmitted in a time domain, and an insertion manner between the control information and the data information comprises:
grouping the control information to obtain at least two control information groups and inserting the at least two control information groups into the data information non-uniformly, wherein the at least two control information groups have a same amount of data; or
grouping the control information to obtain two control information groups; and inserting the two control information groups at two ends of the data information separately, wherein the two control information groups have a same amount of data or different amounts of data.

17. A non-transitory storage medium storing a computer program, wherein when executed by a processor, the computer program implements:
generating a first bit sequence and a second bit sequence;
modulating the first bit sequence with a first modulation scheme to obtain a corresponding modulation symbol comprising control information; and
modulating the second bit sequence with a second modulation scheme to obtain a corresponding modulation symbol comprising data information;
wherein in response to the modulation symbol comprising the control information and the modulation symbol comprising the data information are transmitted in a time domain, and an insertion manner between the control information and the data information comprises:
grouping the control information to obtain at least two control information groups and inserting the at least two control information groups into the data information non-uniformly, wherein the at least two control information groups have a same amount of data; or
grouping the control information to obtain two control information groups; and inserting the two control information groups at two ends of the data information separately, wherein the two control information groups have a same amount of data or different amounts of data.

* * * * *